May 3, 1932.  L. C. BLOMSTROM  1,856,944
APPARATUS FOR VERIFYING ARTICLES PRODUCED IN QUANITY
Filed Nov. 15, 1928  2 Sheets-Sheet 1
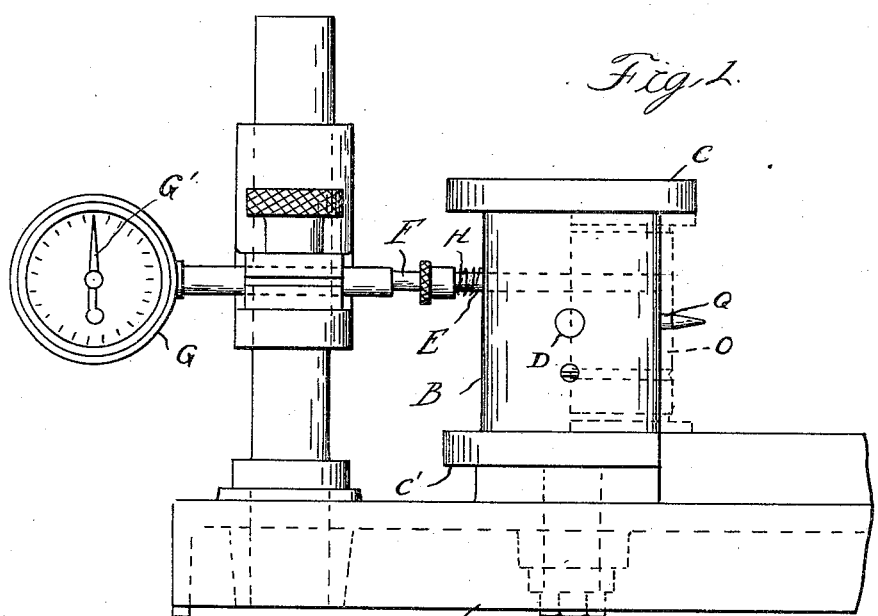
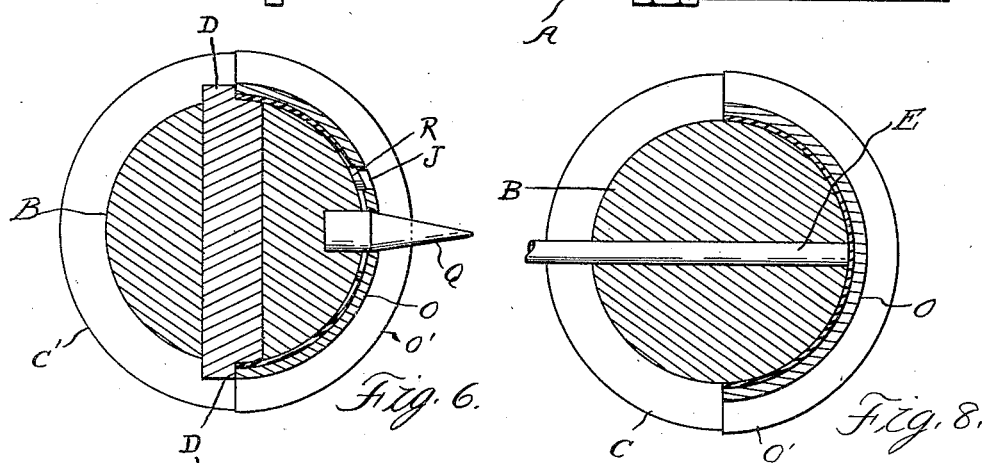
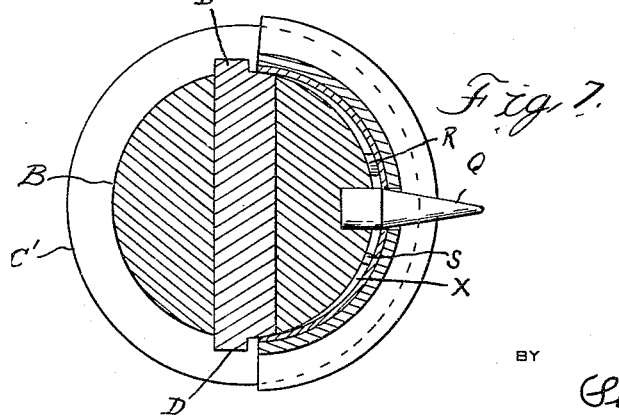
INVENTOR
Lowell C. Blomstrom
BY
Swan Frye and Murray
ATTORNEYS May 3, 1932.  L. C. BLOMSTROM  1,856,944
APPARATUS FOR VERIFYING ARTICLES PRODUCED IN QUANITY
Filed Nov. 15, 1928   2 Sheets-Sheet 2
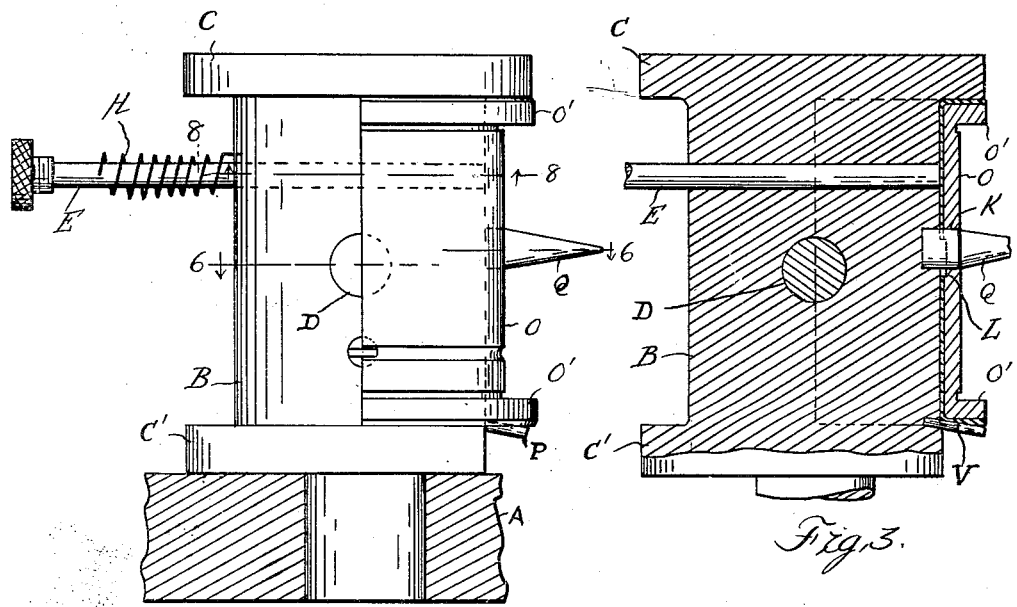
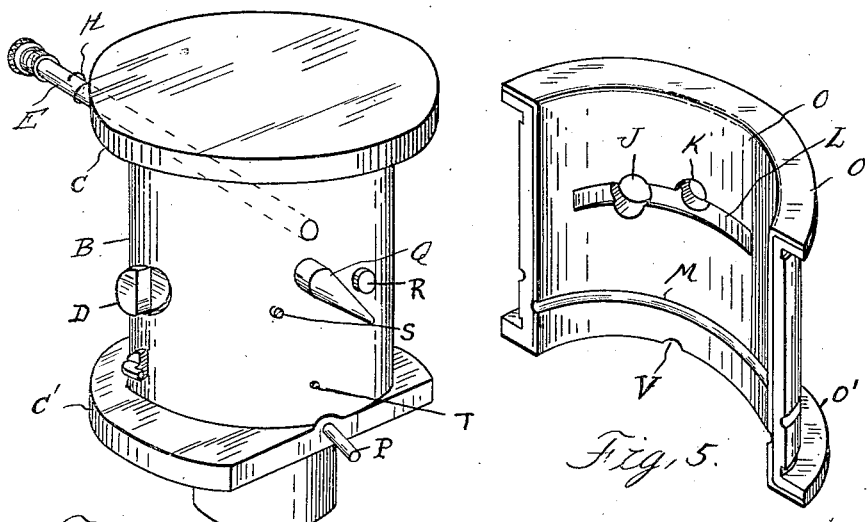
INVENTOR
Lowell C. Blomstrom
BY
Swan Frye and Murray
ATTORNEYS Patented May 3, 1932

1,856,944

UNITED STATES PATENT OFFICE

LOWELL C. BLOMSTROM, OF DETROIT, MICHIGAN, ASSIGNOR TO FEDERAL-MOGUL CORPORATION, OF DETROIT, MICHIGAN, A CORPORATION OF MICHIGAN

APPARATUS FOR VERIFYING ARTICLES PRODUCED IN QUANTITY

Application filed November 15, 1928. Serial No. 319,474.

This invention relates to apparatus for rapid and accurate verifying or testing of articles manufactured in quantities, all of which, in addition to being of initially identical size and contour, must at a later stage in their manufacture, be subjected to certain machining processes or steps, the omission of any one of which would render the article, when offered as complete, subject to rejection, and as to which it has been my experience that reliance upon merely visual inspection, even by a careful operator, cannot be relied upon, in the monotonous repetition of the examining process, to catch the unintended or careless omission of some one of the machining steps. I shall describe my improved apparatus and the method of its use with reference to the inspection of half bearing shells, but it is obvious that the same structural ideas and theory of operation could be applied to other and analogous uses with but negligible changes from the spirit of the disclosure here made, without departure from the fair field which I desire to be understood as covering, and I wish the scope of this disclosure to be understood accordingly.

In the drawings:

Figure 1 is an elevational view of my apparatus.

Figure 2 is a partly sectional elevational view of the master block, with a half-bearing shell positioned thereon, taken from the same direction as Figure 1.

Figure 3 is a sectional elevational view from the same position.

Figure 4 is a perspective of the master block, with the slide rod passing therethrough.

Figure 5 is a perspective of a completely machined half-bearing shell, ready to be placed in testing position against the master block.

Figure 6 is a cross-sectional plan view taken along the line 6—6 of Figure 2, and showing the ideal or accurate fitting of the blank against the master block.

Figure 7 is a similar plan view taken along the same line as that of Figure 6, but bringing out the incorrect fitting of an incompletely machined blank against the master block.

Figure 8 is a sectional plan view taken along the line 8—8 of Figure 2, and looking in the direction of the arrows there shown.

Upon a suitable table A is rested the master block B, which is preferably provided with upper and lower flanges C and C', respectively, the distance between which is just sufficient to permit the slipping between them, and against the curved surface of the block B, of a bearing shell O, which may or may not be provided with flanges, as O'. For convenience of manufacture, the block B is preferably made circular in shape, although half of its surface is either inactive as regards its functioning relatively to the bearing shells under test, or may be contoured more or less variantly from what is here described for testing of a variantly contoured piece. The block B is provided with stop projections or ears D, whose straight-edged portions are located approximately 180° apart, so that when a true semi-cylindrical and fully machined bearing is placed against the master block B, its straight-edged portions will accurately abut against these ears or projections.

Through the master block there slidably engages the test rod E, whose right-hand end, as viewed in all of the various figures of the drawings in which it appears, is adapted to be engaged by the inner or concave surface of the bearing shell when the latter is positioned against the master block. In case the fit of the bearing shell thereagainst is accurate, as brought out in Figures 6 and 8 particularly, the slidable rod E is projected lengthwise to the left sufficiently to actuate the stem F of the gauge G, thus moving its arrow G' around to one of the graduations of its edge indicating a satisfactory and complete condition of the article under test. The return of the stem or rod E to a position wherein its end projects beyond the operative or testing surface of the block B, ready for engagement by the blank next inserted may be effected by any suitable means, as for example the spring H. The projection of the (in Figures 1 and 2) right hand end of the rod E beyond the surface of the master block B is in practice very slight, actually only a very small fraction of an inch, since the gauge-actuating movement of the rod E is intended to take place only if the full surface fit of the supposedly machined bearing against the curved face of the master block occurs, this being made possible only if all of the intended holes and groovings have been machined, so that none of the test projections, as P, Q, R, and S encounter an unmachined surface and thus hold the bearing shell away from fully contacting the surface of the master block B. But if there is such a fit, then the plunger E is moved, against the draw of the spring H, to a gauge-actuating degree.

It will be noted, however, from an examination of Figure 5, particularly, that the concave face of the satisfactory, or fully machined, bearing shell O is provided with sundry machinings, the nature and location of which may of course be varied according to the particular specifications covering the work at any time in progress, and the omission or incompleteness of any one of which, by a careless workman, would justify the rejection of the article when offered as presumably complete. In this instance I have shown a pair of holes, as J and K, a tapered groove L, which partially traverses each of these holes, and another groove, as M, located near the bottom of the shell. The exact size and position of each of these is a matter of careful previous calculation, and has presumably been effected as to each blank during the manufacturing steps intermediate the production of the contoured blank and its offering as a completed article. The omission of any of these, of course, renders the article unfit for the uses to which it is intended, and while such article may be visually inspected to determine the presence or absence of these machined parts, it is obvious that the monotonous character of such inspection, particularly if the workman be at all careless, is quite likely to result in an occasional imperfect or incompletely machined bearing shell being passed.

I therefore, provide on the active semi-cylindrical surface of the master block B a series of projections corresponding to these parts whose machining is essential, such as the pin P, corresponding to the notch V at one edge of the bearing shell, the pin or stem Q, corresponding to the hole K, the stud R, corresponding to the hole J, and the stud S, corresponding to the groove L, and the stud T, corresponding to the groove M. If any one of these described machining steps called for as to each bearing shell has been omitted, the stud or projection on the master block B corresponding thereto, engaging as it will against an unmachined portion of the concave face of the bearing shell under test, will prevent it from fitting accurately about the master block B. I have illustrated this particularly in Figure 7 wherein the machining of the groove L has been omitted and the stud S accordingly engages against an unmachined portion of the bearing shell's concave surface, with its straight edge portion not reaching as far around as the ears D on the block B. When such a bearing shell is encountered, the failure of the bearing shell to fit over and about the active face of the master block leaves a thin crescent-shaped air space between them, which I have indicated by the character X, which prevents the lengthwise actuation of the slidable stem E through the block to the degree necessary to suitably actuate the gauge G, and observation of that insufficient movement enables the worker to at once decide that the shell has been incompletely machined. On the other hand, if all of the machined parts have been accurately made, the fit of the bearing shell against the correspondingly curved side of the master block B is so accurate as to effect the projection of the slidable stem E so that its right hand end is pushed wholly within the bore in the master block, through which it slidably engages, thus enabling its operative actuation of the gauge G to such a degree that the registry of the latter indicates a satisfactory completeness of the bearing shell then under test.

It will of course be obvious that the structural and operative ideas herein disclosed are adaptable to an indefinite variety of contourings of the master block and of the article to be tested, even to the extent of the latter being plain instead of circular or even convex instead of concave, and that any particular form of gauge or observable indicating medium may be used in place of the one herein illustrated, even to the extent of entirely omitting such a specific element.

What I claim is:

1. An inspection apparatus for use with articles produced in quantity, consisting of a body member provided with projections corresponding in position and size with the machined portions of the articles to be tested, a stem slidably supported by said body member in position to be actuated the full extent of its possible path of travel only if none of the projections encounters an unmachined portion of the article under test, and an indicating gauge adapted to be operatively engaged by said stem when the latter has been fully actuated by the unobstructed movement against it of the article under test.

2. In combination with a body member having a general contour corresponding to one face of an article to be tested, including selectively positioned projections which interfere with the accurate fit thereagainst of the article under test unless the latter is provided with machined portions corresponding in position and size with all of such projections, said body also having an opening therethrough, a rod slidably mounted in said opening in said body member and adapted to be terminally engaged by said article when the latter is positioned against said body member, and an indicating member adapted to be operatively engaged by said rod only when the latter is displacingly actuated lengthwise of itself due to the unobstructed fitting thereagainst of the article under test.

3. In combination with a master block having an external contour generally corresponding with that of an article to be tested, and provided with selectively located irregularities of contour which must find in the surface of the article corresponding machined portions as a condition precedent to the accurate fit of the article thereagainst, an indicating element adapted to be actuated to a predetermined degree of observability only when the article under test encounters no obstruction to its accurate fit against said master block.

4. A testing mechanism for articles of predetermined contour and machining, consisting of a selectively shaped and profiled master block against which an article under test may fit accurately only if each of a plurality of the corresponding surface portions of the latter has been adequately worked upon, and an indicating member having a stem slidably supported by said master block in position for operative actuated movement only if the fit of the article when positioned thereagainst is unobstructed by the continued presence of such surface portions as should have been removed from the article under test.

5. The combination, with a normally non-registering gauge, of a master block having an opening therethrough and provided with selectively located projections complementary to machined recessed portions which should be present on each of a series of articles positioned thereagainst, and a stem member engaging through the opening in said master block, and with one of its ends normally projecting beyond the plain portion of the testing face of said master block, adapted to have its other end moved into actuative relation to said gauge when its first mentioned end is successively engaged by the complementary face of each of the individual articles to be tested, provided there be present in each such article all of the selective machinings corresponding to the projections on the master block, thereby allowing the full seating of the unmachined surface portions of the article against the plain active face of the master block.

6. Means for determining the completion or otherwise of specified machining operations upon blanks, comprising a selectively profiled body against which the blanks are adapted to be successively and non-rotatably placed, and a movable element normally projecting beyond the surface of the profiled body and adapted to be moved to registering position only if none of the profilings on said body encounter correspondingly located unmachined portions on the blank, whereby the accurate fit of the latter when pressed thereagainst is made possible.

7. In combination with a master block provided with selectively positioned profilings, a movable contact element normally projecting beyond the profiled surface of said block and adapted to be moved to a position of coincidence of its end with the profiled surface of said block only if the machined contourings of selected parts of its surface permit its accurate fit thereagainst despite the presence of the profilings on said master block.

8. In combination with a selectively profiled block, against which articles under test can be accurately and non-rotatably positioned only if each of several portions of their respective surfaces have been machined correspondingly to the profilings of said block, means adapted to be actuated to indicating position only in case the fit of the article against said block is unobstructed by any of the profilings thereon.

9. The combination, with a master block whose operative face is provided with selectively positioned and contoured projections, of an indicating member normally projecting beyond the operative face of the block and adapted to be projected to indicating position only by the operatively adequate engagement of the positioned blank thereagainst due to there being no unmachined portions of the blank against which some one of the projections upon said master block can interferingly engage.

10. Apparatus for detecting the absence of specified machinings from quantity-produced articles, comprising a master block provided with protuberances corresponding in position to the called-for machinings on the articles under test and the body of said block also having an opening therethrough, and an indicating member slidably engaging through the opening in said master block, and adapted to be projected relatively thereto to indicating position by the tight engagement of the articles against said master block made possible only by the presence of the specified machinings in the surface of such article and the resultant non-interference of any of said protuberances on the master block with the adequate seating of the blank thereagainst.

11. Means for successively testing a quantity of articles for the presence or otherwise of desired contourings in specified positions on the surface of each, comprising a master block provided with correspondingly located projections on a selected portion of its surface, against which latter the articles under test are successively pressed, and an indicating stem positioned in movable relation to said master block with one end normally projecting beyond the plain portion of the active face thereof, said stem being adapted to be moved to a position of coincidence of its normally projecting end with a plain surface portion of the master block by the engagement against it of a corresponding plain portion of each article's surface, which latter is possible only when the presence of all of the desired machinings upon its surface makes possible the non-interfering engagement thereinto of the corresponding profilings on the master block.

In testimony whereof I sign this specification.

LOWELL C. BLOMSTROM.